United States Patent
Lee et al.

(10) Patent No.: US 9,890,280 B2
(45) Date of Patent: Feb. 13, 2018

(54) PREPARATION METHOD FOR ELECTROMAGNETIC WAVE SHIELD COMPOSITE MATERIAL USING COPPER- AND NICKEL-PLATED CARBON FIBER PREPARED BY ELECTROLESS AND ELECTROLYTIC CONTINUOUS PROCESSES, AND ELECTROMAGNETIC WAVE SHIELD COMPOSITE MATERIAL

(71) Applicant: BULLSONE MATERIAL CO., LTD., Incheon (KR)

(72) Inventors: Jong Gil Lee, Incheon (KR); Soo Hyung Hur, Seoul (KR); Min Young Park, Incheon (KR); Byung Rok Kang, Incheon (KR); Ji Hun Kang, Chungcheongnam-do (KR)

(73) Assignee: BULLSONE MATERIAL CO., LTD., Incheon (KR)

( * ) Notice: Subject to any disclaimer, the term of this patent is extended or adjusted under 35 U.S.C. 154(b) by 0 days.

(21) Appl. No.: 14/894,250

(22) PCT Filed: May 29, 2014

(86) PCT No.: PCT/KR2014/004789
§ 371 (c)(1),
(2) Date: Nov. 25, 2015

(87) PCT Pub. No.: WO2014/193169
PCT Pub. Date: Dec. 4, 2014

(65) Prior Publication Data
US 2016/0104939 A1  Apr. 14, 2016

(30) Foreign Application Priority Data

May 31, 2013  (KR) .......... 10-2013-0062962
Dec. 20, 2013  (KR) .......... 10-2013-0159979

(51) Int. Cl.
*G21K 1/10* (2006.01)
*C08L 69/00* (2006.01)
(Continued)

(52) U.S. Cl.
CPC ............ *C08L 69/00* (2013.01); *B29C 70/882* (2013.01); *C08K 3/22* (2013.01); *C08K 9/02* (2013.01);
(Continued)

(58) Field of Classification Search
CPC ......... B29C 70/882; C08L 69/00; C08K 9/02; C08K 2201/001; C08K 7/06;
(Continued)

(56) References Cited

U.S. PATENT DOCUMENTS 5,827,997 A    10/1998  Chung et al. .................. 174/35
2002/0108699 A1  8/2002  Cofer et al. .................. 156/176
(Continued)

FOREIGN PATENT DOCUMENTS

CN    1585799    2/2005
CN    102120891    7/2011
(Continued)

OTHER PUBLICATIONS

ISR dated Sep. 2, 2014 in PCT/KR2014/004789 published as WO 2014/193169.
(Continued)

*Primary Examiner* — David T Karst
(74) *Attorney, Agent, or Firm* — Harness, Dickey & Pierce, P.L.C.

(57) ABSTRACT

The present invention relates to a preparation method for an electromagnetic wave shield composite material and the electromagnetic wave shield composite material prepared by the method. The present invention uses a highly conductive carbon fiber prepared by electroless and electrolytic con-
(Continued)

tinuous processes, and thus is suitable for an EMI shield due to having an excellent conductivity and low surface resistance, and is capable of providing the electromagnetic wave shield composite material having an excellent productivity and economic value. Furthermore, the electromagnetic wave shield composite material of the present invention can be used for blocking electromagnetic waves by being inserted into a cell phone cover and a cell phone pouch, and can also be applied to a bracket for protecting an LCD of a portable display product.

8 Claims, 8 Drawing Sheets

(51) Int. Cl.
*B29C 70/88* (2006.01)
*C08K 9/02* (2006.01)
*H01Q 1/52* (2006.01)
*H01Q 17/00* (2006.01)
*C08K 3/22* (2006.01)
B29K 105/16 (2006.01)
B29K 507/04 (2006.01)
B29L 31/34 (2006.01)
C08K 7/06 (2006.01)
C08K 3/04 (2006.01)

(52) U.S. Cl.
CPC ........... *H01Q 1/526* (2013.01); *H01Q 17/004* (2013.01); *B29K 2105/162* (2013.01); *B29K 2507/04* (2013.01); *B29L 2031/3481* (2013.01); *C08K 3/041* (2017.05); *C08K 7/06* (2013.01); *C08K 2201/001* (2013.01); *C08K 2201/004* (2013.01)

(58) Field of Classification Search
CPC .... C08K 2201/004; C08K 3/041; C08K 3/22; H01Q 1/526; H01Q 17/004; B29K 2105/162; B29K 2507/04; B29L 2031/3481

USPC ........................................................ 523/137
See application file for complete search history.

(56) References Cited

U.S. PATENT DOCUMENTS

| | | | |
|---|---|---|---|
| 2003/0089892 A1* | 5/2003 | Fox .......................... | C08K 7/06 252/500 |
| 2009/0202769 A1* | 8/2009 | Masuda .................. | C08L 23/08 428/36.92 |
| 2009/0233237 A1* | 9/2009 | Yoshiki .................. | H05K 3/106 430/311 |
| 2010/0176090 A1* | 7/2010 | Lochtman ............... | B32B 37/24 216/95 |
| 2011/0160372 A1 | 6/2011 | Youm et al. .................. | 524/403 |
| 2012/0234584 A1* | 9/2012 | Ejiri ....................... | H05K 3/244 174/257 |
| 2013/0177765 A1 | 7/2013 | Lim et al. .............. | H05K 9/009 |

FOREIGN PATENT DOCUMENTS

| | | | | |
|---|---|---|---|---|
| JP | 2009-266953 | 11/2009 | ............... | H05K 9/00 |
| KR | 10-2000-0039345 | 7/2000 | ............ | B60Q 1/068 |
| KR | 10-2006-0039465 | 5/2006 | ............. | G01N 1/22 |
| KR | 10-0656858 | 12/2006 | ................ | H05K 9/00 |
| KR | 10-2009-0031184 | 3/2009 | ............. | H03M 1/66 |
| KR | 10-2009-0057726 | 6/2009 | ............ | C09J 161/06 |
| KR | 10-2011-0078265 | 7/2011 | ............... | C08K 3/04 |
| KR | 10-2012-0034538 | 4/2012 | ............. | C08L 77/10 |
| WO | WO 2003/043028 | 5/2003 | | |

OTHER PUBLICATIONS

Chinese Office Action dated Oct. 10, 2017 in Chinese Patent Application No. 201480030964.9 with English translation.

* cited by examiner

PREPARATION METHOD FOR ELECTROMAGNETIC WAVE SHIELD COMPOSITE MATERIAL USING COPPER- AND NICKEL-PLATED CARBON FIBER PREPARED BY ELECTROLESS AND ELECTROLYTIC CONTINUOUS PROCESSES, AND ELECTROMAGNETIC WAVE SHIELD COMPOSITE MATERIAL

CROSS-REFERENCE TO RELATED APPLICATIONS

This application is a national phase application of PCT Application No. PCT/KR2014/004789, filed on 29 May 2014, which claims benefit of Korean Patent Application 10-2013-0159979, filed on 20 Dec. 2013, which claims benefit of Korean Patent Application 10-2013-0062962, filed on 31 May 2013 The entire disclosures of the applications identified in this paragraph are incorporated herein by reference.

The present invention relates to preparation method for electromagnetic wave shield composite material using copper- and nickel-plated carbon fiber prepared by electroless and electrolytic continuous processes, and electromagnetic wave shield composite material.

BACKGROUND

With the rapid development of the computer and electronic information industry and the appearance of vehicles and high-speed trains equipped with advanced electronic equipment in the 21st century, electromagnetic waves generated from various electronic products mutually influence electronic devices. For example, in some cases, the defects of the vehicle's electronic system in Japan, which were an international issue in early 2010, and the failure of the high-speed rail systems in Korea, were found to result from electromagnetic waves, and the electromagnetic waves may also cause loss of lives.

Moreover, there are a series of medical reports that electromagnetic waves directly cause serious harm to the human body. These electromagnetic waves are classified into high-frequency electromagnetic waves generated from various home appliances, such as mobile phone, radar, TV, and microwave, and low-frequency electromagnetic waves generated from household and industrial power generation, and particularly, electromagnetic waves generated at the high-frequency band of 100 MHz to several GHz cause harm to humans.

The unit to express the electromagnetic shielding effect is designated by decibel (dB), which means the electromagnetic intensity ratio before and after shielding. The effectiveness of 20 dB means the reduction in the amount of electromagnetic waves to 1/10, and the effectiveness of 40 dB means the reduction in the amount of electromagnetic waves to 1/100. It is generally determined that the shielding effect is favorable at 30-40 Db or more. In order to protect electronic devices and human bodies from the harm caused by the generation of electromagnetic waves, the regulations have been strengthened around the globe, and respective countries are strengthening EMI regulations.

Following this trend, a metal substrate is used, or a conductive coating or plating is applied to the substrate, for electromagnetic shielding. The metal substrate has disadvantages in that the processing of complicated patterns is difficult and it's heavy in weight. Moreover, the method of substrate plating is not advantageous in the productivity due to complicated processes therefor, such as degreasing, etching, neutralizing, activating, accelerating, metal depositing, activating, and primary to tertiary plating. Moreover, shielding materials using a filler, such as carbon nanotubes, a metal powder, graphite, or ferrite, have been reported, but they show defects in dispersibility, processability, electromagnetic shielding efficiency, and the like. Metal plating is applied to the filler in order to solve the disadvantages, but such a plating manner of a conductive powder is difficult for practical use due to a delicate process, productivity, and high production prices.

As for recent technologies associated with electromagnetic shielding, U.S. Pat. No. 5,827,997 discloses the complexation of nickel fibers, or carbon filaments plated with nickel through electroplating, with a polymer resin; US Publication No. 2002/0108699 discloses the complexation of conductive fibers with a resin; Korean Patent Application No. 10-2009-0031184 discloses an electromagnetic shielding film containing carbon nanotubes; Korean Patent Application No. 10-2006-0039465 discloses a method for manufacturing an electromagnetic shielding film; Korean Patent Application No. 10-2000-0039345 discloses an electromagnetic shielding material using carbon nanotubes or carbon nanofibers; and Korean Patent Application No. 10-2009-0057726 discloses a method for preparing a polymer/carbon nanotube composite with excellent electromagnetic shielding efficiency.

Throughout the entire specification, many papers and patent documents are referenced and their citations are represented. The disclosures of cited papers and patent documents are entirely incorporated by reference into the present specification, and the level of the technical field within which the present invention falls and details of the present invention are explained more clearly.

DETAILED DESCRIPTION

Technical Problem

The present inventors have endeavored to develop a composite with an excellent electromagnetic shielding performance. As a result of manufacturing a molded product by mixing copper- and nickel-plated carbon fibers obtained by continuous electroless and electrolytic processes and a thermoplastic resin or a thermosetting resin, and then performing injection, extrusion, or discharge molding on the mixture, an excellent electromagnetic shielding effect as well as superior economical feasibility and productivity was confirmed.

Accordingly, an aspect of the present invention is to provide a method for preparing an electromagnetic shielding composite using a thermoplastic resin and copper- and nickel-plated carbon fiber prepared by electroless and electrolytic continuous processes.

Another aspect of the present invention is to provide a method for preparing an electromagnetic shielding composite using a thermosetting resin and copper- and nickel-plated carbon fiber prepared by electroless and electrolytic continuous processes.

Another aspect of the present invention is to provide an electromagnetic shielding composite prepared by the method of the present invention.

Other purposes and advantages of the present disclosure will become clarified by the following detailed description of the invention, claims, and drawings.

Technical Solution

In accordance with an aspect of the present invention, there is provided a method for preparing an electromagnetic shielding composite, the method comprising:

(a) mixing 50-90 wt % of a thermoplastic resin and 10-50 wt % of copper- and nickel-plated carbon fibers obtained by continuous electroless and electrolytic processes; and (b) performing injection or extrusion molding on the product in step (a) to obtain an electromagnetic shielding composite.

In accordance with another aspect of the present invention, there is provided a method for preparing an electromagnetic shielding composite, the method comprising:

(a) mixing 50-90 wt % of a thermosetting resin and 10-50 wt % of copper- and nickel-plated carbon fibers obtained by continuous electroless and electrolytic processes; and (b) performing discharge molding on the product in step (a) to obtain an electromagnetic shielding composite.

The present inventors have endeavored to develop a composite with an excellent electromagnetic shielding performance. As a result of manufacturing a molded product by mixing copper- and nickel-plated carbon fibers obtained by continuous electroless and electrolytic processes and a thermoplastic resin or a thermosetting resin, and then performing injection, extrusion, or discharge molding on the mixture, an excellent electromagnetic shielding effect as well as superior economical feasibility and productivity was confirmed.

In the present invention, an electromagnetic shielding composite is prepared by mixing (i) (i-1) a thermoplastic resin or (i-2) a thermosetting resin, and (ii) copper- and nickel-plated carbon fibers obtained by continuous electroless and electrolytic processes, and performing molding on the mixture.

Hereinafter, the method of the present invention for preparing an electromagnetic shielding composite will be described by steps in detail.

According to an aspect of the present invention, the method for preparing an electromagnetic shielding composite using a thermoplastic resin is as follows:

(a) Mixing Thermoplastic Resin and Copper- and Nickel-Plated Carbon Fibers

First, the method of the present invention includes a step of mixing 50-90 wt % of a thermoplastic resin and 10-50 wt % of a copper- and nickel-plated carbon nanotube obtained by continuous electroless and electrolytic processes.

According to an embodiment of the present invention, the thermoplastic resin is dried using various dryers known in the art, for example, a hot-air dryer, before use.

The thermoplastic resin used in the present invention forms a matrix, and if the content thereof is less than 50 wt %, the moldability and physical properties may be degraded, and if the content thereof is more than 90 wt %, the volume resistance and electromagnetic shielding performance may deteriorate.

According to another embodiment of the present invention, the mixture in step (a) contains 70-90 wt % of a thermoplastic resin and 10-30 wt % of copper- and nickel-plated carbon fibers, and more preferably, 70-80 wt % of a thermoplastic resin and 20-30 wt % of copper- and nickel-plated carbon fibers.

The thermoplastic resin used in the present invention may include various thermoplastic resins known in the art, and may be preferably at least one thermoplastic resin selected from the group consisting of polycarbonate-based resins, polystyrene-based resins, polyether-based resins, polysulfone-based resins, polyolefin-based resins, polyimide-based resins, fluorine-based resins, poly(meth)acrylate-based resins, polyacetal-based resins, polyamide-based resins, aromatic vinyl-based resins, acrylic-butadiene-styrene copolymer resins, and polyvinylchloride-based resins, more preferably at least one selected from the group consisting of polypropylene (PP), polyamide 6 (PA6), polycarbonate (PC), and acrylonitrile-butadiene-styrene resin (ABS), and still more preferably PP, PA6, PC, PC and ABS, or ABS.

The carbon fibers used in the present invention may include various carbon fibers known in the art, and may be commercially purchased, or one prepared from PAN-based or pitch-based materials may be used.

Meanwhile, highly conductive carbon fibers can be obtained by plating carbon fibers with metals, and the average diameter of the highly conductive carbon fibers is 7 μm, and 7.25 μm to 9.5 μm in cases of including the plating thickness, but the diameter of the fibers is not particularly limited to the range of the present invention.

In addition, the carbon fibers used for plating are a bundle type of 12,000 TEX, but the size of TEX is not limited.

The prepared highly conducive carbon fibers may be processed in a chopped state, as shown in FIG. 4, in order to improve processability and dispersibility with a resin.

If the content of the copper- and nickel-plated carbon fibers used in the present invention is less than 10 wt %, the electromagnetic shielding performance may deteriorate, and if the content thereof is more than 50 wt %, physical properties of the composite may be degraded, and the processability and economical feasibility may deteriorate.

According to still another embodiment of the present invention, the copper- and nickel-plated carbon fibers in step (a) have a chopped shape with a length of 3 mm to 500 mm.

According to another embodiment of the present invention, the product in step (a) further contains a conductive material selected from the group consisting of ferrite, graphite, and metal-plated graphite.

The conductive material may be contained in the electromagnetic shielding composite of the present invention for the purpose of reducing the surface resistance and enhancing the internal conductivity of the composite.

In cases where the conductive material is contained, the product in step (a) contains preferably 40-89.5 wt % of a thermoplastic resin, 10-50 wt % of copper- and nickel-plated carbon fibers, and 0.5-10 wt % of a conductive material, more preferably 67-89 wt % of a thermoplastic resin, 10-30 wt % of copper- and nickel-plated carbon fibers, and 1-3 wt % of a conductive material.

According to still another embodiment, the metal which is plated on the graphite is at least one metal selected from the group consisting of aluminum, iron, chromium, stainless steel, copper, nickel, black nickel, silver, gold, platinum, palladium, tin, cobalt, and an alloy of two or more thereof, more preferably at least one metal selected from the group consisting of aluminum, chromium, copper, nickel, silver, platinum, palladium, tin, cobalt, and an alloy of two or more thereof, still more preferably copper, nickel, palladium, or tin, and most preferably nickel.

According to another embodiment of the present invention, the mixing in step (a) is performed by further containing at least one additive selected from the group consisting of a carbon filler, a flame retardant, a plasticizer, a coupling agent, a heat stabilizer, a light stabilizer, an inorganic filler, a releasing agent, a dispersing agent, an anti-dropping agent, and a weathering stabilizer.

According to still another embodiment of the present invention, the method of the present invention further includes, between steps (a) and (b), (a-1) preparing compounding pellets from the product in step (a) using an extruder for pellet manufacturing.

(a-1) Manufacturing Compounding Pellets

According to still another embodiment of the present invention, the compounding pellets are manufactured using an extruder in conditions of a temperature of 230-255° C. and a speed of 70-150 rpm.

As for the extruder, various extruders for pellet manufacturing that are known in the art may be used. As for the extrusion conditions, the temperature section of the extruder is divided into five, which are set to 230° C., 245° C., 245° C., 245° C., and 255° C., respectively, and a speed of 80-120 rpm is more preferable.

(b) Performing Injection or Extrusion Molding, and Obtaining Electromagnetic Shielding Composite Then, the method of the present invention includes a step of performing injection or extrusion molding on the product in step (a) to obtain an electromagnetic shielding composite.

In cases where the injection molding is adopted for the molding method of the present invention, the injection molding in step (b) is performed using an extruder preferably in conditions of a temperature of 215-275° C., a speed of 40-70 rpm, a pressure of 40-80 bars, and a mold cooling time of 4-12 seconds, and more preferably in conditions of a speed of 50-60 rpm, a pressure of 50-70 bars, and a mold cooling time of 6-10 seconds while the temperature section of the extruder is divided into five sections, which are set to 215-255° C., 220-265° C., 220-265° C., 220-265° C., and 230-275° C.

As the extruder used in the injection molding, various extruders that are known in the art may be used.

In cases where the electromagnetic shielding composite is prepared by the injection molding, the copper- and nickel-plated carbon fibers in step (a) have preferably a chopped shape with a length 3 mm to 20 mm, more preferably a chopped shape with a length of 3 mm to 12 mm, still more preferably a chopped shape with a length of 3 mm to 9 mm, still more preferably a chopped shape with a length of 5 mm to 7 mm, in consideration of the size of a discharge port and the injection pressure.

Meanwhile, in cases where the extrusion molding is adopted for the molding method of the present invention, the extrusion molding in step (b) is performed preferably using an extruder in conditions of a temperature of 230-265° C. and a speed of 30-60 rpm, and more preferably using a T-dice in conditions of a speed of 40-50 rpm while the temperature section of the extruder is divided into five sections, which are set to 230° C., 255° C., 255° C., 255° C., and 265° C.

As the extruder used in the injection molding, various extruders that are known in the art may be used.

In cases where the electromagnetic shielding composite is prepared by the injection molding, the electromagnetic shielding composite is prepared into a film or sheet form, and thus the copper- and nickel-plated carbon fibers in step (a) have preferably a chopped shape with a length of 3 mm to 30 mm, more preferably a chopped shape with a length of 6 mm to 18 mm, and still more preferably a chopped shape with a length of 9 mm to 15 mm.

Through this method, the electromagnetic shielding composite may be prepared by mixing (i) a thermoplastic resin and (ii) copper- and nickel-plated carbon fibers obtained by continuous electroless and electrolytic processes and then performing molding on the mixture.

According to another aspect of the present invention, the method for preparing an electromagnetic shielding composite using a thermosetting resin is as follows:

The overlapping descriptions between the method for preparing an electromagnetic shielding composite using a thermoplastic resin and the method for preparing an electromagnetic shielding composite using a thermosetting resin, for example, an additive such as a carbon filler, and the like, will be omitted in order to avoid excessive complication of the present specification.

(a) Mixing Thermosetting Resin and Copper- and Nickel-Plated Carbon Fibers

First, the method of the present invention includes a step of mixing 50-90 wt % of a thermosetting resin and 10-50 wt % of copper- and nickel-plated carbon fibers obtained by continuous electroless and electrolytic processes.

According to an embodiment of the present invention, the mixture in step (a) contains 70-90 wt % of a thermosetting resin and 10-30 wt % of copper- and nickel-plated carbon fibers, and more preferably, 75-88 wt % of a thermoplastic resin and 15-25 wt % of copper- and nickel-plated carbon fibers.

For the thermosetting resin used in the present invention, various thermosetting resins that are known in the art are used, and a liquid phase is used due to characteristics of the resin. The thermosetting resin is at least one thermosetting resin selected from the group consisting of polyurethane-based resins, epoxy-based resins, phenol-based resins, urea-based resins, melamine resins, and unsaturated polyester-based resins, and the thermosetting resin is more preferably a polyurethane-based resin, an epoxy-based resin, or a phenol-based resin, and still more preferably, a polyurethane resin or an epoxy resin.

In cases of using the thermosetting resin, a copper- and nickel-plated carbon nanofiber in a chopped shape with a length of 3 mm to 500 mm may be used, and a copper- and nickel-plated carbon nanofiber in a chopped shape with a length of 3 mm to 60 mm is more preferable.

In cases where a polyurethane resin is used as the thermosetting resin within the above range, the copper- and nickel-plated carbon fibers have preferably a chopped shape with a length of 3 mm to 20 mm, more preferably a chopped shape with a length of 3 mm to 9 mm, and still more preferably a chopped shape with a length of 5 mm to 7 mm. Meanwhile, in cases where an epoxy resin is used as the thermosetting resin, the epoxy resin and a setting agent (preferably, acid anhydride base) are mixed at a weight ratio of 1:0.8-0.96, and then the mixture is mixed with copper- and nickel-plated carbon fibers. Here, the copper- and nickel-plated carbon fibers have preferably a chopped shape with a length of 3 mm to 30 mm, more preferably a chopped shape with a length of 6 mm to 18 mm, and still more preferably a chopped shape with a length of 9 mm to 15 mm.

The mixing may be performed using various mixers that are known in the art for dispersibility of the carbon fibers in the thermosetting resin, preferably at a speed of 500-1500 for 30-5 minutes.

According to still another embodiment of the present invention, the product in step (a) further contains a conductive material selected from the group consisting of ferrite, graphite, and metal-plated graphite, and more preferably, the product in step (a) contains 40-89.5 wt % of a thermosetting resin, 10-50 wt % of copper- and nickel-plated carbon fibers, and 0.5-10 wt % of a conductive material.

(b) Performing Discharge Molding, and Obtaining Electromagnetic Shielding Composite Then, the method of the present invention includes a step of performing discharge molding on the product in step (a) to obtain an electromagnetic shielding composite.

According another embodiment of the present invention, the discharge molding in step (b) further includes: (b-1) discharging the product in step (b) into a mold or a conveyor; (b-2) setting the discharged product in step (b-1); and (b-3) releasing the set product in step (b-2).

In step (b-1), the mold is preferably subjected to release treatment, before the mixture liquid of the thermosetting resin and the copper- and nickel-plated carbon fiber, which is the product in step (b), is discharged into the mold or the conveyor. The release treatment may be performed using various releasing agents that are known in the art.

According to a still more embodiment of the present invention, the setting in step (b-2) may be performed by applying heat, pressure, or UV.

Through this method, the electromagnetic shielding composite may be prepared by mixing (i) a thermosetting resin and (ii) copper- and nickel-plated carbon fibers obtained by continuous electroless and electrolytic processes and then performing molding on the mixture.

According to still another aspect of the present invention, there is provided a method for preparing an electromagnetic shielding composite, the method including: (a) putting a copper- and nickel-plated carbon fiber obtained by continuous electroless and electrolytic processes into a mold or a conveyor; and (b) putting a thermosetting resin to the carbon fibers in step (a) to immerse the carbon fibers in the thermosetting resin, thereby obtaining an electromagnetic shielding composite.

According to the method, a molded product may be manufactured by first arranging highly conductive carbon fibers with a length of 30 mm to 60 mm on a flat mold or a mold and discharging the thermosetting resin thereinto.

The electromagnetic shielding composite prepared through the molding procedure can obtain a low surface resistance and excellent electromagnetic shielding property since the carbon fibers are dispersed to form multiple contact points in the molded product, such that the carbon fibers are dispersed in a network form in which the carbon fibers are linked to each other.

It can be verified from FIG. 3 that the highly conductive carbon fibers are dispersed in a network form in the resin.

One of the greatest characteristics of the present invention is that the electromagnetic shielding composite prepared by the method of the present invention contains copper- and nickel-plated carbon fibers obtained by continuous electroless and electrolytic processes, and thus has a further improved electromagnetic shielding effect compared with the non-plated carbon fibers.

The copper- and nickel-plated carbon fibers used in the present invention are highly conductive carbon fibers with excellent electrical conductivity obtained by continuous electroless and electrolytic processes, which have been developed by the present inventors, and are prepared by the method as follows.

Specifically, the copper- and nickel-plated carbon fibers obtained by continuous electroless and electrolytic processes are prepared by the method including the following steps: (a) allowing carbon fibers to pass through an electroless plating liquid to plate the carbon fibers with copper for 6-10 minutes, the electroless plating liquid containing, on the basis of the volume of pure water, 2.5-5.5 g/l Cu ions, 20-55 g/l EDTA, 2.5-4.5 g/l formalin, 2-6 g/l triethanolamine (TEA), 25% NaOH 8-12 ml/l, and 0.008-0.15 g/l 2,2'-bipiridine, at pH 12-13 and a temperature of 36-45° C.; and (b) allowing the copper-plated carbon fiber in step (a) to pass through an electrolytic plating liquid to plate the copper-plated carbon fiber with nickel for 1-3 minutes, the electrolytic plating liquid containing 280-320 g/l $Ni(NH_2SO_3)_2$, 15-25 g/l $NiCl_2$, and 35-45 g/l $H_3BO_3$, at pH 4.0-4.2 and a temperature of 50-60° C.

Hereinafter, the method of the present invention for preparing metal-plated carbon fibers obtained by continuous electroless and electrolytic processes will be described by the following steps:

(a) Electroless Plating Process

First, the method of the present invention includes a step of electroless plating carbon fibers with a metal.

In one embodiment, in cases where the carbon fibers are plated with copper, an electroless plating liquid contains pure water, a copper metal salt, a complexing agent, a reducing agent, a stabilizer, and a pH adjusting agent.

The copper metal salt contained in the electroless plating liquid supplies copper ions to impart conductivity to the carbon fibers, and formalin as a reducing agent, EDTA as a complexing agent, triethanolamine (TEA) and 2,2'-bipiridine as a stabilizer, and 25% NaOH as a pH adjusting agent were used.

As can be confirmed in examples, the more the contents of formalin as a reducing agent and NaOH as a pH adjusting agent, which are contained in the electroless plating liquid, the faster the plating rate, but the shorter the lifespan of the plating liquid, and thus considering this matter, the contents of the reducing agent and the pH adjusting agent were adopted.

Meanwhile, as can be clearly confirmed from examples, as a result of testing the plating rate and the liquid stability by adjusting the content of the reducing agent while the contents of the copper ions and the complexing agent increase at the same ratio, the plating rate and the thickness of the plating layer can be controlled by adjusting the concentrations of copper ions and formalin as a reducing agent, and the specific gravity, strength, elastic modulus, and strain can be controlled through the control of the thickness of the plating layer. However, since a thicker plating layer results in the increase in the specific gravity and the deteriorations in the strength, elastic modulus, and strain, the present invention solved the above problems by conducting electrolytic plating while the concentrations of the copper ions and formalin as a reducing agent were adjusted, thereby improving conductivity with a thin thickness. This is why the present invention adopts continuous electroless and electrolytic processes.

According to another embodiment of the present invention, the electroless plating step in step (a) is characterized by allowing carbon fibers to pass through an electroless plating liquid to plate the carbon fibers with copper for 6-10 minutes, the electroless plating liquid containing, on the basis of the volume of pure water, 2.5-3.5 g/l Cu ions, 25-35 g/l EDTA, 2.5-3.5 g/l formalin, 2-3 g/l triethanolamine (TEA), 25% NaOH 8-12 ml/l, and 0.008-0.01 g/l 2,2'-bipiridine, at pH 12-13 and a temperature of 36-40° C.

According to still another embodiment of the present invention, the electroless plating step in step (a) is characterized by allowing carbon fibers to pass through an electroless plating liquid to plate the carbon fibers with copper for 6-10 minutes, the electroless plating liquid containing, on the basis of the volume of pure water, 2.5-3.5 g/l Cu ions, 20-30 g/l EDTA, 2.5-3.5 g/l formalin, 2-3 g/l triethanolamine (TEA), 25% NaOH 8-12 ml/l, and 0.008-0.01 g/l 2,2'-bipiridine, at pH 12-13 and a temperature of 36-45° C.

According to another embodiment of the present invention, the electroless plating step in step (a) is characterized by allowing carbon fibers to pass through an electroless plating liquid to plate the carbon fibers with copper for 6-10 minutes, the electroless plating liquid containing, on the basis of the volume of pure water, 4.5-5.5 g/l Cu ions, 30-40 g/l EDTA, 2.5-3.5 g/l formalin, 4-6 g/l triethanolamine (TEA), 25% NaOH 8-12 ml/l, and 0.01-0.15 g/l 2,2'-bipiridine, at pH 12-13 and a temperature of 40-45° C.

According to a high-rate plating bath in still another embodiment of the present invention, the electroless plating in step (a) is characterized by allowing carbon fibers to pass through an electroless plating liquid to plate the carbon fibers with copper for 6-10 minutes, the electroless plating liquid containing, on the basis of the volume of pure water, 4.5-5.5 g/l Cu ions, 45-55 g/l EDTA, 3.5-4.5 g/l formalin, 4-6 g/l triethanolamine (TEA), 25% NaOH 8-12 ml/l, and 0.01-0.15 g/l 2,2'-bipiridine, at pH 12-13 and a temperature of 40-45° C.

In addition, after the electroless plating, three stages of washing were performed, and the third washing among the three stages of washing was performed by adding 1-2% $H_2SO_4$. This is for keeping the pH of an electrolytic plating bath and activating surfaces of the electroless-plated carbon fibers.

(b) Electrolytic Plating Process

Next, the method of the present invention includes a step of, after the carbon fibers are plated with copper by the electroless plating process, continuously plating the carbon nanotubes with nickel by an electrolytic plating process.

One of the characteristics of the present invention is that the electrical conductivity of the carbon fibers was improved by conducting an electroless plating process and then a nickel electrolytic plating process.

An electrolytic plating liquid for conducting the electrolytic plating process employs $Ni(NH_2SO_3)_2$ and $NiCl_2$ as a nickel metal salt and $H_3BO_3$ as a pH buffer.

As can be clearly confirmed from examples, the carbon fibers obtained by continuous electroless and electrolytic processes reduced the electric resistance value by about 32- to 37-fold compared with non-plated carbon fibers, and reduced by 2-fold compared with comparative examples, thereby improving electrical conductivity.

It is determined that the copper pores are filled by quickly conducting the Ni electrolytic plating, after the electroless plating, and as a result, the electrical conductivity was improved.

According to another embodiment of the present invention, the electrolytic plating process in step (b) is performed by applying a constant voltage (CV) of 5-15 V.

In cases of the electroless copper plating and electrolytic nickel plating continuous processes, the electrolytic plating process is performed by applying a constant voltage (CV) of 5-10 V, and more preferably 6-8 V.

The advantage of the electroless and electrolytic plating is that an alloy layer is formed that exhibits excellent electrical conductivity, is effective in adhesive strength and flexibility, has a thin thickness due to an electrolytic metal material adhering to spaces of the metal, which are generated in the electroless plating, and retains excellent conductivity. In addition, the electroless and electrolytic plating produces an effect of uniformly plating carbon fibers.

Electroless (copper) plating is first performed, and electrolytic plating was continuously performed. A voltage is applied to carbon fibers put in the bath, and thus electrolyte ions are combined with pores generated from the electroless plating, thereby producing a product with a small plating thickness and improved conductivity.

According to still another embodiment of the present invention, the carbon fibers in step (a) are pre-treated by the method including the following steps: (i) allowing carbon fibers to pass through an aqueous solution containing a surfactant, an organic solvent, and a non-ionic surfactant, to degrease and soften the carbon fibers; (ii) allowing the carbon fibers resulting from step (i) to pass through an aqueous solution containing sodium bisulfate ($NaHSO_3$), $H_2SO_4$, ammonium persulfate (($NH_4)_2S_2O_8$), and pure water, to conduct an etching process that functions neutralizing, washing, and conditioning; (iii) allowing the carbon fibers resulting from step (ii) to pass through an aqueous solution of $PdCl_2$ to conduct a sensitizing process; and (iv) allowing the carbon fibers resulting from step (iii) to pass through an aqueous solution of sulfuric acid ($H_2SO_4$) to conduct an activating process.

(i) Degreasing and Softening Carbon Fibers

In the method of the present invention, for the pretreatment of the carbon fibers, first, the carbon fibers are degreased and softened by allowing the carbon fibers to pass through an aqueous solution containing a surfactant, an organic solvent, and a non-ionic surfactant.

The aqueous solution containing a surfactant, an organic solvent, and a non-ionic surfactant performs a degreasing action of removing epoxy or urethane that has been sized to the carbon fibers while swelling to soften the surfaces of the fibers.

According to still another embodiment of the present invention, the aqueous solution in step (i) contains 15-35 wt % of a solution, as a surfactant, in which pure water and NaOH are mixed at a weight ratio of 40-49:1-10, 50-80 wt % of diethyl propanediol and 5-15 wt % of dipropylene glycol methyl ether as an organic solvent, and a non-ionic surfactant with 400-600 ppm, and more preferably, 20-30 wt % of a solution, as a surfactant, in which pure water and NaOH are mixed at a weight ratio of 45-48:2-5, 58-72 wt % of diethyl propanediol and 8-12 wt % of dipropylene glycol methyl ether as an organic solvent, and a non-ionic surfactant with 400-600 ppm.

The non-ionic surfactant may include various non-ionic surfactants in the art, preferably includes ethoxylated linear alcohol, ethoxylated linear alkyl-phenol or ethoxylated linear thiol), more preferably is ethoxylated linear alcohol.

According to still another preferable embodiment of the present invention, step (i) was performed at a temperature of 40-60° C. for 1-5 minutes, and more preferably at a temperature of 45-55° C. for 1-3 minutes.

(ii) Etching Process

Next, for the pretreatment of the carbon fibers, an etching process is performed that neutralizes strong alkali components, helps a washing process for a next process, a sensitizing process, and performs a conditioning action.

An aqueous solution for the etching process contains sodium bisulfate ($NaHSO_3$), sulfuric acid ($H_2SO_4$), ammonium persulfate (($NH_4)_2S_2O_8$), and pure water.

More preferably, the aqueous solution in step (ii) contains 0.1-10 wt % of sodium bisulfate ($NaHSO_3$), 0.1-3 wt % of sulfuric acid ($H_2SO_4$), 5-25 wt % of ammonium persulfate (($NH_4)_2S_2O_8$), and 62-94.8 wt % of pure water, and still more preferably, 0.8-2 wt % of sodium bisulfite; $NaHSO_3$, 0.3-1 wt % of sulfuric acid ($H_2SO_4$), 10-20 wt % of ammonium persulfate (($NH_4)_2S_2O_8$), and 77-88.9 wt % of pure water.

According to still another preferable embodiment of the present invention, step (ii) is performed at a temperature of 20-25° C. for 1-5 minutes, and more preferably at a temperature of 20-25° C. for 1-3 minutes.

(iii) Sensitizing Process

Then, a sensitizing process is performed by allowing the carbon fibers resulting from step (ii) to pass through an aqueous solution of $PdCl_2$.

The sensitizing process is for allowing metal ions to be adsorbed on the surfaces of the surface-modified carbon fibers.

The concentration of the aqueous solution of $PdCl_2$ is more preferably 10-30%, and still more preferably 15-25%.

According to still another embodiment of the present invention, step (iii) was performed at a temperature of 20-40° C. for 1-5 minutes, and more preferably at a temperature of 25-35° C. for 1-3 minutes.

(iv) Activating Process

Then, for the pretreatment method of the carbon fibers, an activating process is performed by allowing the carbon fibers resulting from step (iii) to pass through an aqueous solution of sulfuric acid ($H_2SO_4$).

The activating process is shown to be performed after the sensitizing process in the present description, but conducting the activating process together with the sensitizing process is included within the scope of the present invention.

The activating process is performed in order to remove Sn that has been colloidized for the prevention of Pd oxidation.

More preferably, the concentration of the aqueous solution of sulfuric acid ($H_2SO_4$) is 5-15%.

According to still another preferable embodiment of the present invention, step (iv) is performed at a temperature of 40-60° C. for 1-5 minutes, and more preferably at a temperature of 45-55° C. for 1-3 minutes.

The carbon fibers may be pre-treated by this method, and the pre-treated carbon fibers may be plated with metals, copper and nickel, by continuous electroless and electrolytic processes.

According to still another aspect of the present invention, the present invention provides an electromagnetic shielding composite prepared by the method of the present invention.

The electromagnetic shielding composite of the present invention is prepared by the preparation method of the electromagnetic shielding composite, and thus the overlapping descriptions therebetween are omitted to avoid excessive complication of the specification due to repetitive descriptions thereof.

The electromagnetic shielding composite of the present invention can be used for electromagnetic shielding by being inserted into a hand phone cover and a pouch, and can be applied to brackets for protecting LCD, which is a portable display product.

Advantageous Effects

Features and advantages of the present invention are summarized as follows.

(a) The present invention provides a method for preparing an electromagnetic shielding composite and an electromagnetic shielding composite prepared by the method.

(b) The present invention can provide an electromagnetic shielding composite which is suitable for EMI shielding due to excellent conductivity and a low surface resistance thereof, and has excellent productivity and economical feasibility, by using highly conducive carbon fibers obtained by continuous electroless and electrolytic processes.

MODE FOR CARRYING OUT THE INVENTION

Figure 1:
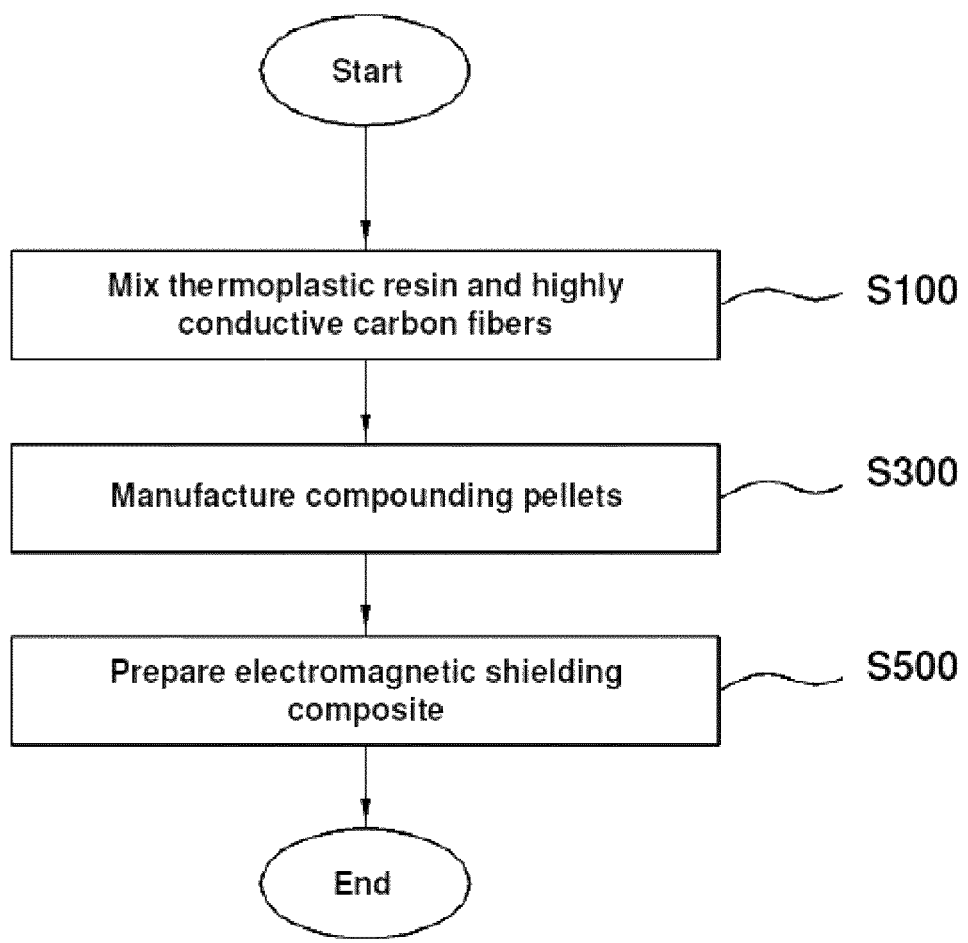
FIG. 1 is a block diagram showing a process for preparing an electromagnetic shielding composite according to an embodiment of the present invention.
Figure 2:
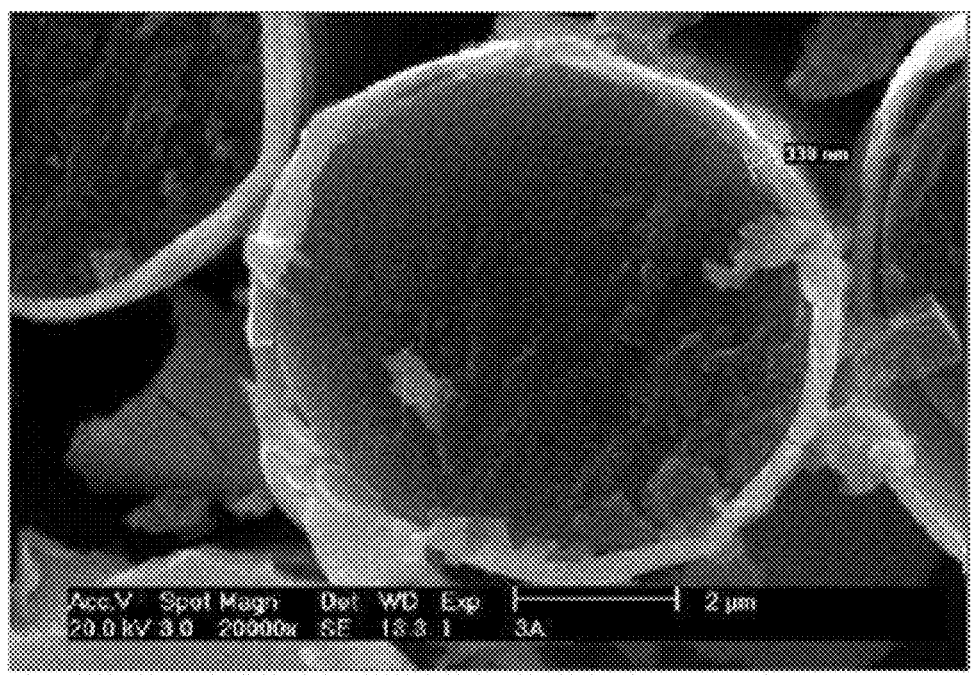
FIG. 2 is a cross-sectional image of a highly conductive carbon fiber plated by continuous electroless and electrolytic processes.
Figure 3:
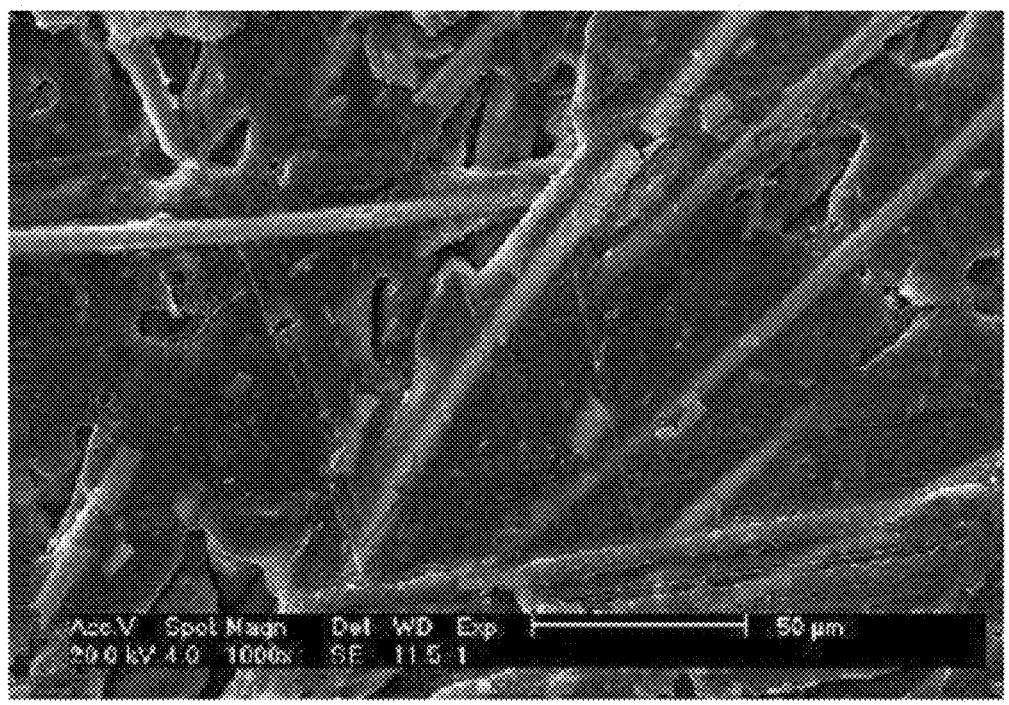
FIG. 3 is an image showing a surface in which highly conductive carbon fibers in a chopped shape are dispersed in a network form with contact points.
Figure 4:
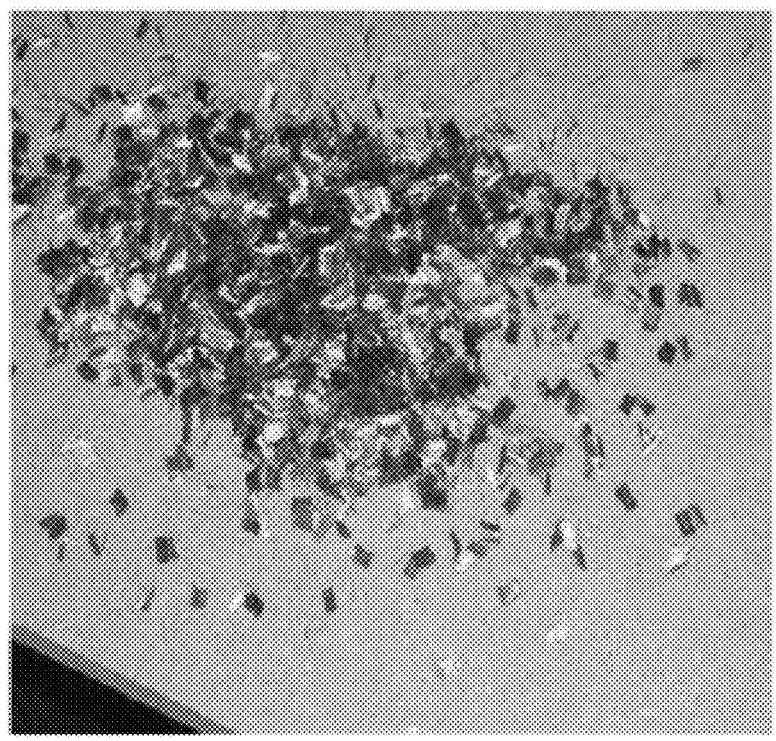
FIG. 4 is an image showing that highly conductive carbon fibers plated by continuous electroless and electrolytic processes are processed in a chopped shape.
Figure 5:
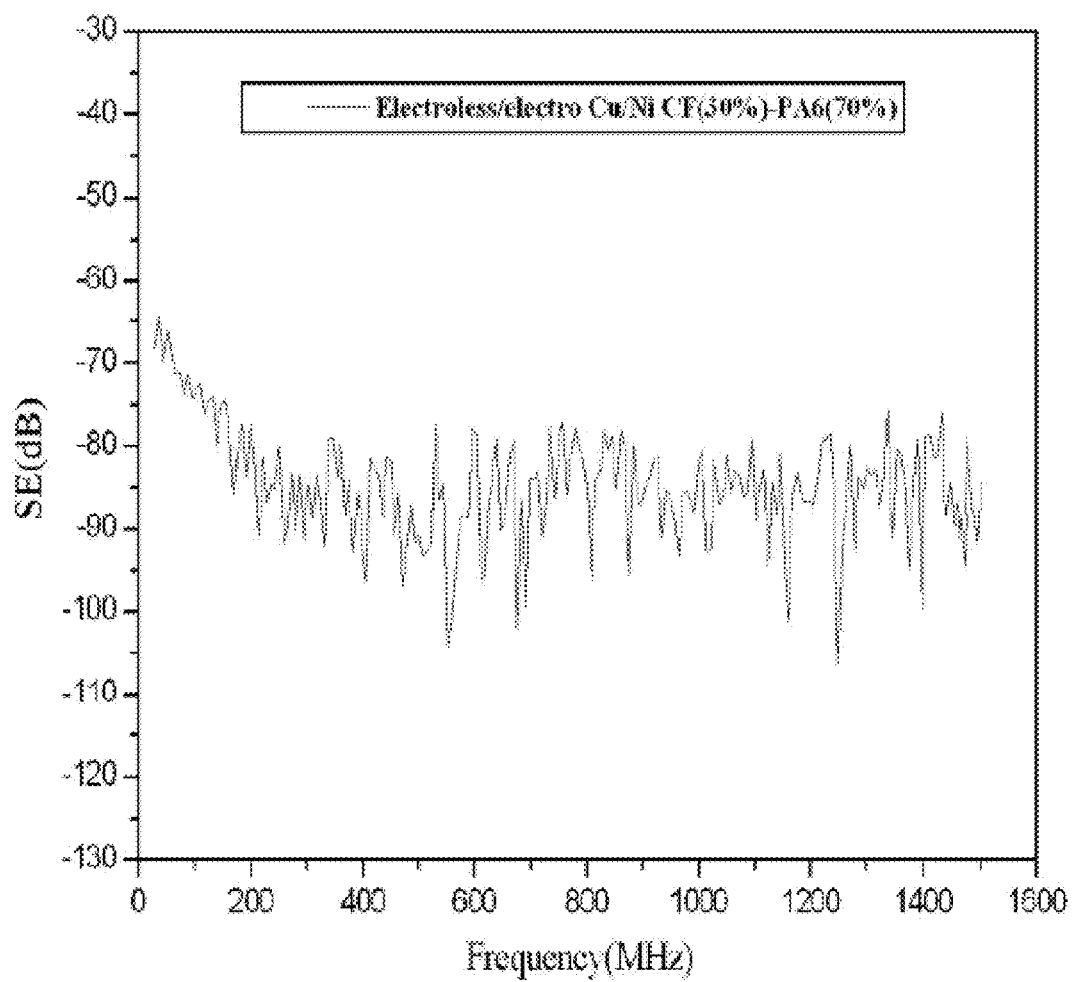
FIG. 5 is a graph showing an electromagnetic shielding effect of a molded product using carbon fibers prepared by the continuous processes.
Figure 6:
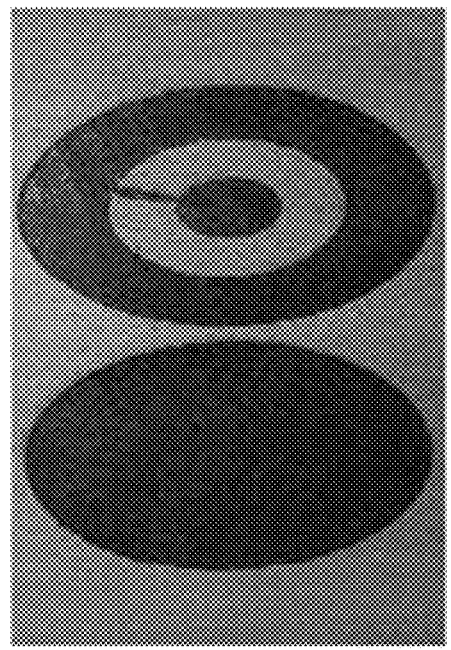
FIG. 6 is a view showing a sample for the electromagnetic shielding test.
Figure 7:
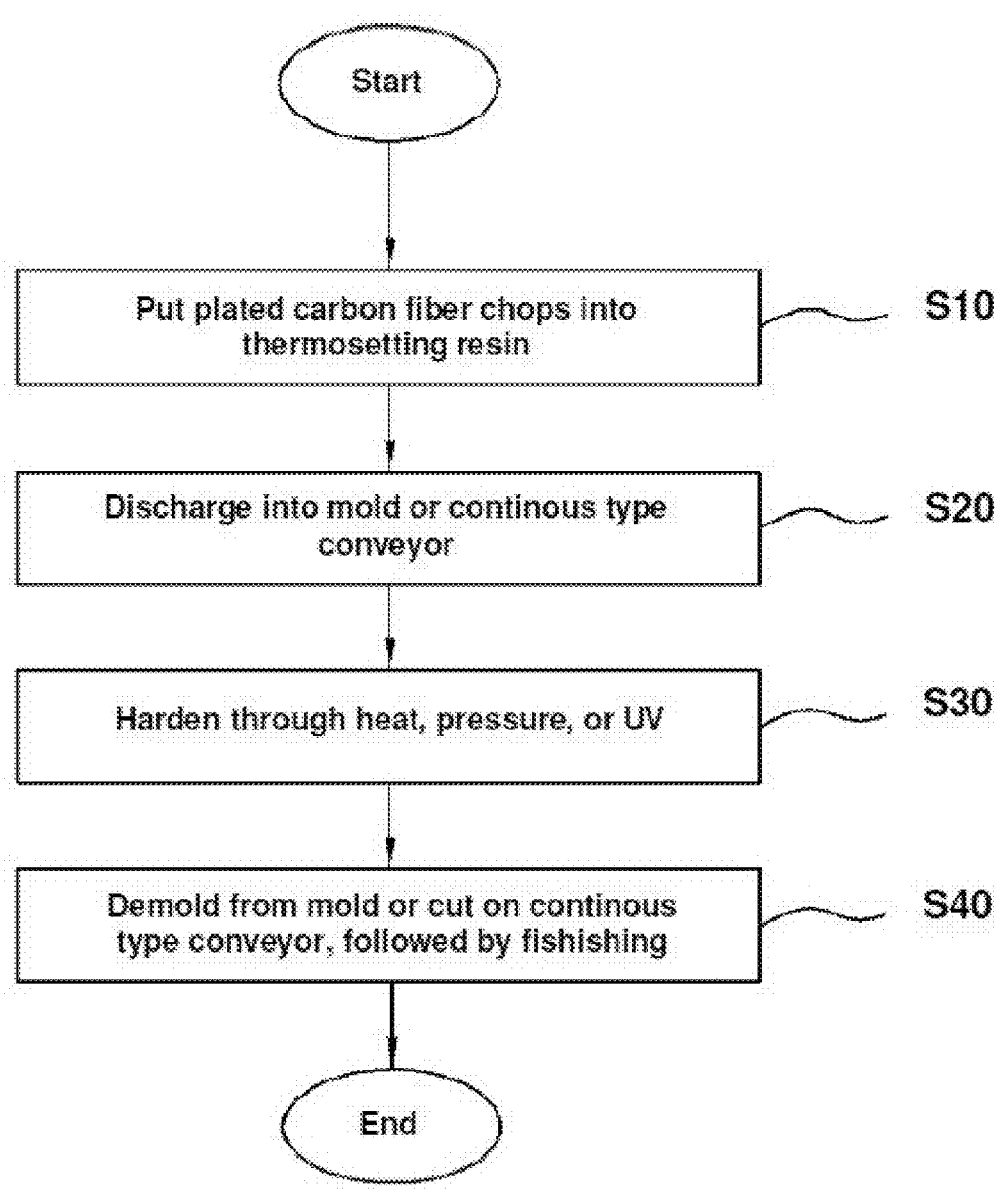
FIG. 7 is a block diagram showing a process for preparing an electromagnetic shielding composite using a thermosetting resin according to another embodiment of the present invention.

Hereinafter, the present invention will be described in detail with reference to examples. These examples are only for illustrating the present invention more specifically, and it will be apparent to those skilled in the art that the scope of the present invention is not limited by these examples.

Throughout the present specification, the term "%" used to express the concentration of a specific material, unless otherwise particularly stated, refers to (wt/wt)% for solid/solid, (wt/vol)% for solid/liquid, and (vol/vol)% for liquid/liquid.

EXAMPLES

Materials and Methods

The respective components used in examples and comparative examples were as follows:

(A) As a thermoplastic resin, BJ700 from Samsung Total was used for polypropylene (PP), KN120 from Kolon was used for polyimide 6 (PA6), LUPOY PC1201-22 from LG Chemical was used for polycarbonate (PCT), and ABS XR401 from LG Chemical was used for an acrylonitrile-butadiene-styrene (ABS) resin. (B) As a thermosetting resin, UP 395 from Kukdo Chemical was used for polyurethane (PU), and KBR1753 from Kukdo Chemical was used for epoxy. In addition, (C) as carbon fibers, Cu—Ni-plated carbon fibers through continuous electroless and electrolytic processes, which were prepared by Bulsone Material were used. The carbon fibers were cut into chopped shapes with 6 mm, 12 mm, and 30 mm. In addition, as other additives, a product from Novamet was used for nickel-plated graphite.

Meanwhile, the electromagnetic shielding test, that is, EMI shielding property (dB) was determined by measuring the electromagnetic shielding performance according to ASTM D 4935.

Example 1

Manufacturing of Electromagnetic Shielding Sheets by Injection Molding and Evaluation Thereof Molding was performed while the contents of the respective components were shown in table 1. Injection molded products were manufactured in a sheet form with a thickness of 0.7 mm. Specifically, thermoplastic resins, PP (grade BJ 700, melting index: 25, density: 0.91 g/cm$^3$, heat deflection temperature: 105° C., Samsung Total), PC (grade LUPOY PC 1201-22, melting index: 22, density: 1.2 g/cm$^3$, heat deflection temperature: 147° C., LG Chemical), and ABS (grade ABS XR401, melting index: 9, density: 1.05 g/cm$^3$, heat deflection temperature: 105° C., LG Chemical) were, respectively, dried for 6 hours in a vacuum oven at 80° C. After that, the dried thermoplastic resins were mixed in contents thereof shown in table 1. Then, each mixture was fed into an extruder (twin injection machine; manufactured by Woojin, Korea, GT-1 9300), and injected through a mold with a standard specified by ASTM D4935. In cases of the PP mixture, the temperature section was divided into five, which was set to 215° C., 220° C., 220° C., 220° C., and 230° C., respectively, and working was performed under 55 rpm, 60 bars, and a mold cooling time of 8 seconds. In cases of the PC mixture and the ABS mixture, the temperature was set to 255° C., 265° C., 265° C., 265° C., and 275° C. in the same machine, and working was performed under 55 rpm, 60 bars, and a mold cooling time of 8 seconds.

The manufactured sheets were subjected to an electromagnetic shielding test, and the result values are shown (table 1).

TABLE 1

| Highly conductive carbon fibers | Additive | Thermoplastic resin | EMI SE (dB) (at 1.0 GHz) |
|---|---|---|---|
| Cu + Ni carbon fibers (6 mm, 30 wt %) | — | PP 70 wt % | 72 |
| | Ferrite 2 wt % | PP 68 wt % | 72 |
| | Ni-plated graphite 2 wt % | PP 68 wt % | 82 |
| | — | PC 70 wt % | 67 |
| | Ferrite 2 wt % | PC 68 wt % | 70 |
| | Ni-plated graphite 2 wt % | PC 68 wt % | 81 |
| | — | PC/ABS 70 wt % | 68 |
| | Ferrite 2 wt % | PC/ABS 68 wt % | 72 |
| | Ni-plated graphite 2 wt % | PC/ABS 68 wt % | 81 |
| | — | PA6 70 wt % | 81 |
| | Ferrite 2 wt % | PA6 68 wt % | 80 |
| | Ni-plated graphite 2 wt % | PA6 68 wt % | 84 |

Example 2

Manufacturing of Molded Products by Injection and Extrusion Molding Processes and Evaluation Thereof Molded products were manufactured from the above components by injection and extrusion processes shown in tables 2 and 3, respectively, and the electromagnetic shielding performance thereof was tested. For the manufacturing of the injection molded products shown in table 2 below, PP (grade BJ 700, melting index: 25, density: 0.91 g/cm$^3$, heat deflection temperature: 105° C., Samsung Total) was dried in a vacuum oven at 80° C. for 6 hours. Then, the dried PP was mixed with copper- and nickel-plated carbon fibers (6 mm) in contents thereof shown in table 2 below. In addition, sheets were manufactured by injecting the mixtures into injected products with a size specified by ASTM D4935 in the same conditions as in example 1.

TABLE 2

Manufacturing of molded product through injection molding

| Composite | EMI SE (dB) (at 1.0 GHz) |
|---|---|
| PP/Cu—Ni carbon fibers (90/10 wt %) | 16.4 |
| PP/Cu—Ni carbon fibers (80/20 wt %) | 54 |
| PP/Cu—Ni carbon fibers (70/30 wt %) | 72 |

Injection molding, fiber length 6 mm chopped

Meanwhile, for the manufacturing of the extrusion molded products shown in table 3 below, PA6 (KOPA KN120, melting point: 222° C., density: 1.14 g/cm$^3$, relative viscosity (RV): 2.75, KOLON Ltd) was dried for 6 hours in a vacuum oven at 80° C. The dried PA6 was mixed with copper- and nickel-plated carbon fibers (12 mm) in contents thereof shown in table 3 below. In addition, the mixtures were fed into an extruder for pellet manufacturing (twin screw compounding extruder; Bowtech, Korea, BA-11) while the temperature section was divided into five, which was set to 230° C., 245° C., 245° C., 245° C., and 255° C., respectively, and then discharged at 100 rpm, followed by a water cooling process, thereby manufacturing composite pellets. The manufactured pellets were made into sheet form molded products with a thickness of 0.7 mm, using T-dice in an extruder for sheet manufacturing, self-manufactured by Ecogreen at temperature sections of 230° C., 255° C., 255° C., 255° C., and 265° C., at a speed of 45 rpm.

TABLE 3

Manufacturing of molded product through extrusion molding

| Composite | EMI SE (dB) (at 1.0 GHz) |
|---|---|
| PA 6/Cu—Ni carbon fibers (90/10 wt %) | 25.4 |
| PA 6/Cu—Ni carbon fibers (80/20 wt %) | 58.2 |
| PA 6/Cu—Ni carbon fibers (70/30 wt %) | 81 |

Extrusion molding, fiber length 12 mm chopped

Example 3

Manufacturing Molded Products Using Thermosetting Resins and Evaluation Thereof In table 4, sheets were manufactured by immersing highly conductive Cu- and Ni-plated carbon fibers in a polyurethane resin and an epoxy resin, which are representative thermosetting resins, and the electromagnetic shielding performance thereof was measured.

Polyurethane PU (grade UP 395, viscosity: 1500 cps, specific gravity: 1, one-component urethane, Korea, Kukdo Chemical) and copper- and nickel-plated carbon fibers (6 mm chop) were quantified at a weight ratio of 80:20 in a beaker, and then mixed at 1000 rpm in a mixer for 1 minute, thereby preparing a mixture liquid. 20 g of the prepared mixture liquid was drawn off on a glass substrate that was subjected to release treatment (an appropriate amount of WD-40 from 3M was sprayed on a 5 mm-thick glass substrate, which was then uniformly rubbed with a cotton cloth, and then kept in an oven at 70° C. for 3 minutes, thereby inducing the sufficient stabilization of the releasing agent, and then the surface is wiped with a smooth tissue, and the pollutants were finally removed), and was pushed to have a thickness of 0.7 mm by a glass rod, thereby molding a sheet form. The molded glass substrate was dried and hardened in an oven at 50° C. for 24 hr, thereby obtaining a final molded product.

An epoxy resin (KBR-1753, viscosity: 800 cps, Korea, Kukdo Chemical) and a hardener (KBH-1089, Acid Anhydride-based, Korea, Kukdo Chemical) were mixed at a weight ratio of 100:92 to prepare a mixed epoxy solution. The mixed solution and the copper- and nickel-plated carbon fibers (12 mm chop) were quantified at a weight ratio of 80:20 in a beaker, and mixed in a mixer at 100 rpm for 1 minute, thereby preparing a mixture liquid. 20 g of the prepared mixture liquid was drawn off on a glass substrate that was subjected to release treatment, and was pushed to have a thickness of 0.7 mm by a glass rod, thereby molding a sheet form. The molded glass substrate was dried and cured in an oven at 150° C. for 24 hr, thereby obtaining a final molded product.

TABLE 4

| Composite | EMI SE (dB) (at 1.0 GHz) |
| --- | --- |
| Polyurethane/Cu-Ni carbon fibers (80/20 wt %)(6 mm) | 56.7 |
| Mixed epoxy solution/Cu-Ni carbon fibers (80/20 wt %)(12 mm) | 57.3 |

Comparative Example 1

Manufacturing of Injection and Extrusion Molded Products Using Non-Plated Carbon Fibers and Evaluation Thereof In comparative example 1, the non-plated carbon fibers were subjected to injection molding and extrusion molding, respectively, and the shielding performance thereof was measured. Specifically, the non-treated carbon fiber chops with a length of 6 mm or 12 mm were subjected to molding in contents thereof shown in table 5 under the same conditions as in examples 1 and 2, thereby obtaining molded products. In cases of the extrusion molding, the pellets were first prepared, and dried in a drying furnace, and then manufactured into continuous type sheets with a thickness of 0.7 mm in an extruder.

TABLE 5

| Composite | EMI SE (dB) (at 1.0 GHz) | Molding method |
| --- | --- | --- |
| PP/carbon fibers (80/20 wt %)(6 mm) | 13 | Injection molding |
| PA 6/carbon fibers (80/20 wt %)(12 mm) | 14 | Extrusion molding |

It can be seen that, in examples 1, 2, and 3 above, the electromagnetic shielding performance is different depending on the content of highly conductive carbon fibers regardless of the kind of resin. In addition, when the nickel-coated graphite was added at the compositional ratio of the same content of the highly conductive carbon fibers, the electromagnetic shielding effect slightly increased.

It seems that the reason why the shielding efficiency slightly increased in the injection molding rather than in the extrusion molding is that the surface of the molded product has an integral skin due to the mold in cases of the extrusion molding.

The reason why example 3 had a slight increase in the shielding efficiency compared with the extrusion molded product using the thermoplastic resin is that the mutual contact points between carbon fibers were formed more stably in example 3 rather than the injection molded product.

In comparative example 1, the injection and extrusion molded products using the metal-non-plated carbon fibers showed a half level of the electromagnetic shielding efficiency compared with the same content of the highly conductive carbon fibers.

Therefore, the present invention shows that the electromagnetic shielding effect is very excellent when a predetermined content of highly conductive carbon fibers obtained by continuous electroless and electrolytic processes are contained.

Meanwhile, the Cu—Ni double-plated carbon fibers obtained by continuous electroless and electrolytic processes, which were manufactured by Bulsone Material and used in examples 1 to 3 above, were pretreated and prepared through the following process.

Example 4

Pretreatment Procedure of Carbon Fibers

1) Degreasing and Softening Processes

First, the epoxy or urethane that has been sized to the carbon fibers was removed using an organic solvent, and a process of swelling to soften the surfaces of the fibers was performed at the same time.

The degreasing and softening processes were performed by allowing carbon fibers (12K, purchased from Toray, Hyosung, or Taekwang (TK)) to pass through a pretreatment bath containing 25 wt % of a solution in which pure water and NaOH were mixed at a weight ratio of 47:3, as a surfactant; 65 wt % of diethyl propanediol and 10 wt % of dipropylene glycol methyl ether, as an organic solvent; and 500 ppm ethoxylated linear alcohol as a non-ionic surfactant (low foam). The degreasing and softening processes were performed at a temperature of 50° C. for 2 minutes.

2) Etching Process

An etching process was performed, in order to neutralize strong alkali components of NaOH using sulfuric acid ($H_2SO_4$), reducing the load of a sensitizing process as a next process, and helping a washing action and performing a conditioning action using ammonium peroxysulfate $((NH_4)_2S_2O_8)$ to enhance the adsorption of palladium.

Specifically, an etching process was performed by allowing the carbon fibers, which were subjected to the degreasing and softening processes, to pass through a pretreatment bath containing 1 wt % of sodium bisulfate ($NaHSO_3$), 0.5 wt % of sulfuric acid ($H_2SO_4$), 5 wt % of ammonium persulfate $((NH_4)_2S_2O_8)$, and 83.5 wt % of pure water, to perform neutralizing, washing, and conditioning actions. The etching process was performed at a temperature of 20-25° C. for 2 minutes.

3) Sensitizing Process (Catalyst Imparting Process)

A sensitizing process was performed by treating the carbon fibers, which were subjected to the etching process, with 20% $PdCl_2$ at a temperature of 30° C. for 2 minutes. The sensitizing process is performed in order to allow metal ions to be adsorbed on surfaces of the surface-modified carbon fibers.

4) Activating Process

An activating process is performed together with the sensitizing process. The carbon fibers were treated with 10% sulfuric acid ($H_2SO_4$) at a temperature of 50° C. for 2 minutes in order to remove Sn that has been colloidized for the prevention of Pd oxidation.

The carbon fibers were pretreated by the above processes.

Examples 5 and 6

Figure 8:
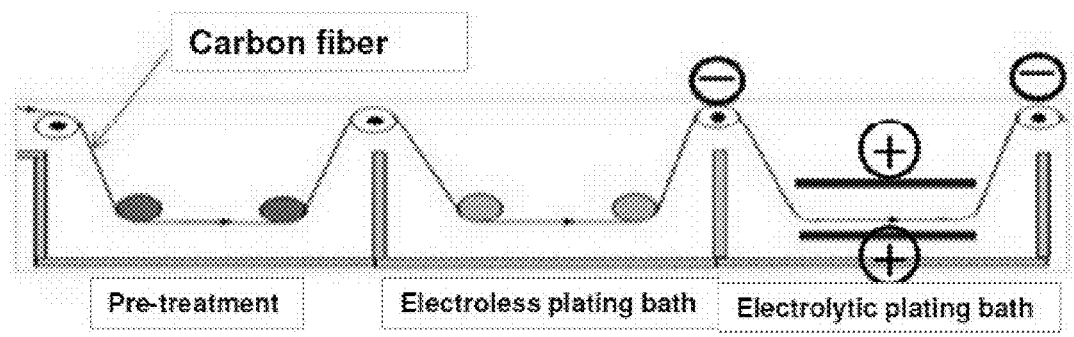
FIG. 8 shows an apparatus for surface treatment of carbon fibers, used in the present invention.

Copper- and Nickel-Plated Carbon Fibers Obtained by Electroless and Electrolytic Continuous Plating Processes The carbon fibers (12K, purchased from Toray) pretreated in example 4 and the carbon fibers (12K, purchased from Taekwang (TK)) pretreated in example 4 were subjected to an electroless copper plating process in the compositions and conditions shown in table 6, and then continuously subjected to an electrolytic nickel plating process in the compositions and conditions shown in table 7, using a plating apparatus shown in the accompanying FIG. 8, thereby preparing copper- and nickel-plated carbon fibers, which were then used for examples 5 and 6. Hereinafter, the contents of components of the plating liquids are on the basis of 1 L of pure water.

TABLE 6

Electroless copper plating liquid

| — | Component | Content (Conditions) |
|---|---|---|
| Metal salt | Cu ion | 3 g/l |
| Complexing agent | EDTA | 30 g/l |
| Reducing agent | Formalin | 3.0 g/l |
| Stabilizer | TEA (triethanol amine) | 3 g/l |
| 안정제 | 2,2'-bipiridine | 0.01 g/l |
| pH adjusting agent | NaOH (25%) | 12 ml/l |
| | Temperature | 38° C. |
| | pH | 12.5 |
| | Treatment time | 6 min |

TABLE 7

Electrolytic Ni plating liquid

| — | — | Component | Content (Conditions) |
|---|---|---|---|
| Electrolytic plating liquid | Nickel metal salt | $Ni(NH_2SO_3)_2$ | 300 g/l |
| | | $NiCl_2$ | 20 g/l |
| | pH buffer | $H_3BO_3$ | 40 g/l |
| | Temperature | | 55° C. |
| | pH | | 4.2 |
| | Treatment time | | 1 min |

Example 7

Copper- and Nickel-Plated Carbon Fibers Obtained by Electroless and Electrolytic Continuous Plating Processes The carbon fibers pretreated in example 4 were subjected to an electroless copper plating process in the compositions and conditions shown in table 8, and then continuously subjected to an electrolytic nickel plating process in the compositions and conditions shown in table 9, using a plating apparatus in the accompanying FIG. 8, thereby preparing copper- and nickel-plated carbon fibers.

TABLE 8

Electroless copper plating liquid

| — | Component | Content (Conditions) |
|---|---|---|
| Metal salt | Cu ion | 2.5-3.5 g/l |
| Complexing agent | EDTA | 25-35 g/l |
| Reducing agent | Formalin | 2.5-3.5 g/l |
| Stabilizer | TEA (triethanol amine) | 2-3 g/l |
| | 2,2'-bipiridine | 0.008-0.01 g/l |
| pH adjusting agent | NaOH(25%) | 8-12 ml/l |
| | Temperature | 36-40° C. |
| | pH | 12-13 |
| | Treatment time | 6-10 min |

TABLE 9

Electrolytic Ni plating liquid

| — | — | Component | Content (Conditions) |
|---|---|---|---|
| Electrolytic plating liquid | Nickel metal salt | $Ni(NH_2SO_3)_2$ | 280-320 g/l |
| | | $NiCl_2$ | 15-25 g/l |
| | pH buffer | $H_3BO_3$ | 35-45 g/l |
| | Temperature | | 50-55° C. |
| | pH | | 4.0-4.2 |
| | Treatment time | | 1-3 min |

For the electrolytic plating, a constant voltage (CV) of 5-10 V was applied to an electrolytic nickel bath. A Ni metal plate or Ni balls were used for a metal plate used as a positive electrode.

Example 8

Copper- and Nickel-Plated Carbon Fibers Obtained by Electroless and Electrolytic Continuous Plating Processes The carbon fibers pretreated in example 4 were subjected to an electroless copper plating process in the compositions and conditions shown in table 10, and then continuously subjected to an electrolytic nickel plating process in the compositions and conditions shown in table 11, using a plating apparatus in the accompanying FIG. 8, thereby preparing copper- and nickel-plated carbon fibers.

TABLE 10

Electroless copper plating liquid

| — | Component | Content (Conditions) |
|---|---|---|
| Metal salt | Cu ion | 4.5-5.5 g/l |
| Complexing agent | EDTA | 45-55 g/l |
| Reducing agent | Formalin | 3.5-4.5 g/l |
| Stabilizer | TEA (triethanol amine) | 4-6 g/l |
|  | 2,2'-bipiridine | 0.01-0.15 g/l |
| pH adjusting agent | NaOH(25%) | 8-12 ml/l |
|  | Temperature | 40-45° C. |
|  | pH | 12-13 |
|  | Treatment time | 6-10 min |

TABLE 11

Electrolytic Ni plating liquid

| — | Component | | Content (Conditions) |
|---|---|---|---|
| Electrolytic plating liquid | Nickel metal salt | Ni(NH$_2$SO$_3$)$_2$ | 280-320 g/l |
|  |  | NiCl$_2$ | 15-25 g/l |
|  | pH buffer | H$_3$BO$_3$ | 35-45 g/l |
|  | Temperature |  | 50-55° C. |
|  | pH |  | 4.0-4.2 |
|  | Treatment time |  | 1-3 min |

For the electrolytic plating, a constant voltage (CV) of 5-10 V was applied to an electrolytic nickel bath. A Ni metal plate or Ni balls were used for a metal plate used as a positive electrode.

Test Example 1

Measurement on Change in Current Density and Linear Resistance Value of Plated Carbon Fiber The optimization conditions for electroless and electrolytic plating were set by adjusting the concentration of NaOH, which adjusts pH, and the concentration of HCHO, which helps the reduction reaction of Cu, among the compositions and conditions for preparing copper- and nickel-plated carbon fibers in example 7.

While 25% NaOH varies 8, 9, 10, 11, and 12 ml/l, and HCHO varies 2.5, 2.7, 2.9, 3.1, and 3.3 g/l, respectively, the change in the current density (A) flowing through the carbon fibers was measured, and the linear resistance (Ω/30 cm) of the finally obtained products (copper- and nickel-plated carbon fibers) was evaluated, and the results were summarized in table 12 below. A constant voltage (CV) of 7 V was applied to an electrolytic nickel bath, and the other conditions that were uniformly maintained were summarized in tables 13 and 14 below.

TABLE 12

| HCHO | NaOH | Current density (A) | Resistance (Ω/30 cm) | Period of use of plating liquid |
|---|---|---|---|---|
| 2.5 | 8 | 100 | 0.8 | 10 turns |
|  | 9 | 110 | 0.6 |  |
|  | 10 | 120 | 0.4 |  |
|  | 11 | 130 | 0.3 |  |
|  | 12 | 140 | 0.2 |  |
| 2.7 | 8 | 110 | 0.7 | 8 turns |
|  | 9 | 120 | 0.6 |  |
|  | 10 | 130 | 0.5 |  |
|  | 11 | 140 | 0.3 |  |
|  | 12 | 150 | 0.2 |  |
| 2.9 | 8 | 120 | 0.6 | 6 turns |
|  | 9 | 130 | 0.5 |  |
|  | 10 | 140 | 0.4 |  |
|  | 11 | 150 | 0.3 |  |
|  | 12 | 160 | 0.2 |  |
| 3.1 | 8 | 130 | 0.6 | 4 turns |
|  | 9 | 140 | 0.5 |  |
|  | 10 | 150 | 0.4 |  |
|  | 11 | 160 | 0.3 |  |
|  | 12 | 170 | 0.2 |  |
| 3.3 | 8 | 140 | 0.5 | 2 turns |
|  | 9 | 150 | 0.4 |  |
|  | 10 | 160 | 0.3 |  |
|  | 11 | 170 | 0.2 |  |
|  | 12 | 180 | 0.1 |  |

In table 11 above, 1 turn expresses 1 make-up amount of electroless copper plating.

TABLE 13

Electroless copper plating liquid

| — | Component | Content (Conditions) |
|---|---|---|
| Metal salt | Cu ion | 3 g/l |
| Complexing agent | EDTA | 30 g/l |
| Reducing agent | Formalin (HCHO) | 2.5-3.3 g/l |
| Stabilizer | TEA (triethanol amine) | 3 g/l |
|  | 2,2'-bipiridine | 0.10 g/l |
| pH adjusting agent | NaOH(25%) | 8-12 ml/l |
|  | Temperature | 37° C. |
|  | pH | 12.5 |
|  | Treatment time | 6 min |

TABLE 14

Electrolytic plating liquid

| — | Component | | Content (Conditions) |
|---|---|---|---|
| Electrolytic plating liquid | Nickel metal salt | Ni(NH$_2$SO$_3$)$_2$ | 300 g/l |
|  | Nickel metal salt | NiCl$_2$ | 20 g/l |
|  | pH buffer | H$_3$BO$_3$ | 40 g/l |
|  | Temperature |  | 55° C. |
|  | pH |  | 4.2 |
|  | Treatment time |  | 1 min |
|  | Constant voltage (Cv) |  | 7 V |

As can be confirmed from table 12 above, as the amounts of the reducing agent and NaOH increased, the plating rate increased, but the lifespan of the plating liquid was shortened. Therefore, it may be preferable to maintain the amount of the reducing agent at the minimum (2.5-3.0 g/l) and the amount of NaOH at the maximum.

Test Example 2

Test on Plating Rate and Liquid Stability

For the plating rate and the liquid stability test through the adjustment of the concentrations of copper ions and a complexing agent (EDTA), the optimization conditions for copper plating were tested by adjusting the amount of the reducing agent (table 15) when the copper ions and the complexing agent were increased at the same ratio, and the other conditions that were uniformly maintained were summarized in tables 16 and 17 below.

TABLE 15

| Metal salt (Cu) | Reducing agent (HCHO) | Complexing agent(EDTA) | NaOH | Plating thickness (μm) |
|---|---|---|---|---|
| 2.5 | 2.5 | 25 | 12 | 0.2-0.3 |
| 3.5 | 3.0 | 35 |  | 0.3-0.5 |
| 4.5 | 3.5 | 45 |  | 0.4-0.6 |
| 5.5 | 4   | 55 |  | 0.5-0.8 |

TABLE 16

Electroless copper plating liquid

| — | Component | Content (Conditions) |
|---|---|---|
| Metal salt | Cu ion | 2.5-5.5 g/l |
| Complexing agent | EDTA | 25-55 g/l |
| Reducing agent | Formalin | 2.5-4 g/l |
| Stabilizer | TEA (triethanol amine) | 3 g/l |
|  | 2,2'-bipiridine | 0.01 g/l |
| pH adjusting agent | NaOH(25%) | 12 ml/l |
|  | Temperature | 37° C. |
|  | pH | 12.5 |
|  | Treatment time | 6 min |

TABLE 17

Electrolytic plating liquid

| — | Component | Content (Conditions) |
|---|---|---|
| Electrolytic plating liquid | Nickel metal salt | $Ni(NH_2SO_3)_2$ 300 g/l |
|  |  | $NiCl_2$ 20 g/l |
|  | pH buffer | $H_3BO_3$ 40 g/l |
|  | Temperature | 55° C. |
|  | pH | 4.2 |
|  | Treatment time | 1 min |
|  | C.V | 7 V |

As can be seen from table 15 above, it was verified that, as the concentrations of copper and HCHO were higher, the high-rate plating was possible, and the thickness of the plating layer was increased (plating thickness: 0.7 microns or more). For a preferable plating thickness, 0.3 μm, of the carbon fiber, the best products were obtained when the concentration of copper ions was 2.5-3.0 g/l and the concentration of HCHO was 2.5-3.0 g/l.

As the plating thickness of the carbon fiber increases, the specific gravity increases and the strength, elastic modulus, and strain deteriorate, and thus carbon fibers with excellent electrical conductivity were prepared by conducting Ni electrolytic plating on Cu pores in a shorter time after the electroless plating, rather than compulsorily increasing the plating thickness in the electroless plating.

Test Example 3

Comparision of Physical Properties and Electrical Conductivity

Table 18 shows comparision of physical properties, electrical conductivity, and the like, between copper- and nickel-plated carbon fibers in examples 5 and 6 and nickel-plated carbon fibers on the market prepared by an electroless plating process, as comparative example 2.

TABLE 18

| — | Comparative example 2 | Example 5 | Example 6 | Note |
|---|---|---|---|---|
| Strand strength ($kgf/mm^2$)(Range) | 280 | 380 (367~405) | 338 (325~353) | — |
| Elastic modulus ($tons/mm^2$) | 22.0 | 20.0 | 22.5 | — |
| Strain (%) | 1.2 | 1.9 | 1.5 | — |
| Specific gravity ($g/cm^3$) | 2.70 | 2.7277 | 2.7894 | — |
| Diameter (μm) | 7.5 | 7.828 | 7.705 | — |
| Tex (Fiber thickness) | 1420 | 1575 | 1561 | — |
| Electric resistance (Ω/m) | — | 0.8 | 0.7 | — |
| Electric resistance (Ωcm) | $7.5 \times 10^{-5}$ | $4.62 \times 10^{-5}$ | $4.05 \times 10^{-5}$ | — |
| Electric resistance compared with general CF | — | 32-fold reduction | 37-fold reduction | General CF: $1.50 \times 10^{-3}$ Ωcm |
| Coating thickness (nm) | 250 | 240 (210~271) | 350 (305~392) | — |

As can be seen from table 18 above, the copper- and nickel-plated carbon fibers had excellent physical properties and exhibited excellent electrical conductivity values due to the low electric conductivity values, compared with comparative example 2 prepared by the electroless plating process.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A method for preparing an electromagnetic shielding composite comprising:
    (a) copper plating a carbon fiber by passing said carbon fiber through an electroless plating liquid,
    wherein the electroless plating liquid contains 2.5-5.5 g/l Cu ions, 20-55 g/l EDTA, 2.5-4.5 g/l formalin, 2-6 g/l triethanolamine (TEA), 8-12 ml/l 25% NaOH, and 0.008-0.15 g/l 2,2'-bipiridine on the basis of the volume of pure water,
    wherein the electroless plating liquid has pH 12-13 and a temperature of 36-45° C.;
    (b) nickel plating the copper-plated carbon fiber by passing the copper-plated carbon fiber through an electrolytic plating liquid,
    wherein the electrolytic plating liquid contains 280-320 g/l $Ni(NH_2SO_3)_2$, 15-25 g/l $NiCl_2$, and 35-45 g/l $H_3BO_3$,
    wherein the electrolytic plating liquid has pH 4.0-4.2 and a temperature of 50-60° C.;

(c) mixing 50-90 wt % of a thermoplastic resin and 10-50wt % of copper- and nickel-plated carbon fibers;

(d) preparing compounding pellets from the product in step (c) by performing extrusion in conditions of a temperature of 230-255° C. and a speed of 70-150 rpm; and (e) performing injection or extrusion molding on the product in step (c) to obtain an electromagnetic shielding composite, wherein the copper- and nickel-plated carbon fiber in step (c) has a chopped shape with a length of 3 mm to 500 mm.

2. The method of claim 1, wherein the thermoplastic resin is at least one thermoplastic resin selected from the group consisting of polycarbonate-based resins, polystyrene-based resins, polyether-based resins, polysulfone-based resins, polyolefin-based resins, polyimide-based resins, fluorine-based resins, poly(meth)acrylate-based resins, polyacetal-based resins, polyamide-based resins, aromatic vinyl-based resins, acrylic-butadiene-styrene copolymer resins, and polyvinylchloride-based resins.

3. The method of claim 1, wherein the product in step (c) further comprises a conductive material selected from the group consisting of ferrite, graphite, and metal-plated graphite.

4. The method of claim 3, wherein the product in step (c) comprises 40-89.5 wt % of the thermoplastic resin, 10-50 wt % of the copper- and nickel-plated carbon fibers, and 0.5-10 wt % of the conductive material.

5. The method of claim 3, wherein a metal of the metal-plated graphite is at least one metal selected from the group consisting of aluminum, iron, chromium, stainless, copper, nickel, black nickel, silver, gold, platinum, palladium, tin, cobalt, and an alloy of two or more thereof.

6. The method of claim 1, wherein the injection molding in step (e) fill is performed in an extruder in conditions of a temperature of 215-275° C., a speed of 40-70 rpm, a pressure of 40-80 bars and a mold cooling time of 4-12 seconds.

7. The method of claim 1, wherein the extrusion molding in step (e) is performed in an extruder in conditions of a temperature of 230-265° C. and a speed of 30-60 rpm.

8. The method of claim 1, wherein the mixing in step (c) is performed by mixing with the thermoplastic resin and the copper- and nickel-plated carbon fibers at least one additive selected from the group consisting of a carbon filler, a flame retardant, a plasticizer, a coupling agent, a heat stabilizer, a light stabilizer, an inorganic filler, a releasing agent, a dispersing agent, an anti-dropping agent and a weathering stabilizer.

* * * * *